(12) United States Patent
Murofushi et al.

(10) Patent No.: US 6,197,360 B1
(45) Date of Patent: *Mar. 6, 2001

(54) PROCESSES FOR THE PRODUCTION OF NOODLES BY MACHINES

(75) Inventors: Keiithiro Murofushi, Shizuoka-ken; Fusaki Kajio, Ohimachi; Akio Fujita, Ohimachi; Futoshi Hirasawa, Ohimachi, all of (JP)

(73) Assignee: Nisshin Flour Milling Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/955,743

(22) Filed: Oct. 22, 1997

(30) Foreign Application Priority Data

Oct. 25, 1996 (JP) .................................................... 8-300917
Sep. 29, 1997 (JP) .................................................... 9-263467

(51) Int. Cl.$^7$ ....................................................... A23L 1/16
(52) U.S. Cl. ............................................ 426/557; 426/451
(58) Field of Search ..................................... 426/451, 557

(56) References Cited

U.S. PATENT DOCUMENTS 4,234,617 * 11/1980 Sakakibara et al. .................. 426/557
4,370,352 * 1/1983 Murakami et al. ................... 426/557
4,414,235 * 11/1983 Takehoshi ............................. 426/557
4,888,193 * 12/1989 Konno et al. ......................... 426/557

FOREIGN PATENT DOCUMENTS

| 59-88057 | * 9/1984 | (JP) . |
| 5-292908 | * 2/1994 | (JP) . |
| 6-95904 | 11/1994 | (JP) . |
| 7-123902 | 5/1995 | (JP) . |

* cited by examiner

*Primary Examiner*—Lien Tran
(74) *Attorney, Agent, or Firm*—Oblon, Spivak, McClelland, Maier & Neustadt, P.C.

(57) ABSTRACT

A process for the production of noodles by machines, which comprises the steps of:

(i) preparing a noodle dough with 38 to 55% of water added to a raw material, (ii) forming the noodle dough into a noodle sheet, (iii) maturing the noodle sheet at a temperature of 30 to 35° C. and a relative humidity of 70 to 90% for 10 to 60 minutes, (iv) rolling a matured noodle sheet followed by cutting into strands of noodles, and (v) stretching the strands at a stretching ratio of 1.5 to 2 times into desired strands of a noodle product. The process comprises further the step of adding an edible oil and lipase to the noodle dough. Those processes can produce simply the noodles of high quality having good eating quality in a short time period with good productivity.

8 Claims, 3 Drawing Sheets

PROCESSES FOR THE PRODUCTION OF NOODLES BY MACHINES

This invention relates to a process of producing noodles of high quality by machines easily and in a short time period and with high productivity, said noodles having very good eating quality or texture and taste, similar to hand-made noodles.

BACKGROUND OF THE INVENTION

In general, hand-made noodles such as "Tenobe So-men" (very thin hand-made noodles), "Tenobe Hiyamugi" (thin hand-made noodles) and "Tenobe Udon" (standard hand-made noodles) have been prepared by a method wherein water, salt and others are added to wheat flour and mixed, a soft dough is formed into a rope-like dough and the dough is twisted and stretched out repeatedly into the final products. Such hand-made noodles are especially in favor with consumers, because of their good eating quality or texture in respect of viscoelasticity and smoothness. However, the manufacture of hand-made noodles is complicated, requires a long time and much labor, thus increasing a manufacturing cost. Therefore, it is difficult to provide consumers with the hand-made product at an economical cost.

On the other hand, machine-made noodles have been produced by sheeting a hard dough containing lower amount of added water than that of the hand-made noodles by passing long sheet into strands of the desired width by a pair of cutting rolls. In this case, a series of complex operations including mixing of wheat flour, water, salt and others, sheeting a noodle dough and cutting a sheet into noodle strands can be performed by machines in a short time period, thus leading to mass production of noodles. This gives an advantage of providing consumers with the noodle products at an economical cost. However, machine-made noodles are inferior to hand-made noodles in viscoelasticity, smoothness, taste and others, due to lower amount of added water and easy damage of the dough by sheeting through rolls.

Now, there have been proposed a variety of processes for the production of noodles by machine with a view to produce machine-made noodles having good eating quality or texture and taste comparable to hand-made noodles, in a short time with good productivity.

Japanese Patent Kokoku 6-95904 and Japanese Patent Kokai 7-123902 disclose that the noodles containing higher amount of added water which are superior in taste to those containing lower amount of added water can be produced by maturing a noodle sheet as sheeted by continuous sheeting rolls, stretching the matured sheet followed by cutting into strands, and again maturing the strands, and repeating such stretching and maturing operations several times as desired to deaerate the strands in the mechanical stretching and maturing processes. However, those processes require a multiple repetition of stretching and maturing of noodle strands, for which more reduction in production time has been desired.

SUMMARY OF THE INVENTION

An object of the invention is to provide a process for producing noodles of high quality by machines easily and in a short time period and with high productivity, said noodles having very good eating quality or texture and taste, similar to hand-made noodles.

DETAILED DESCRIPTION OF THE INVENTION

Figure 1:
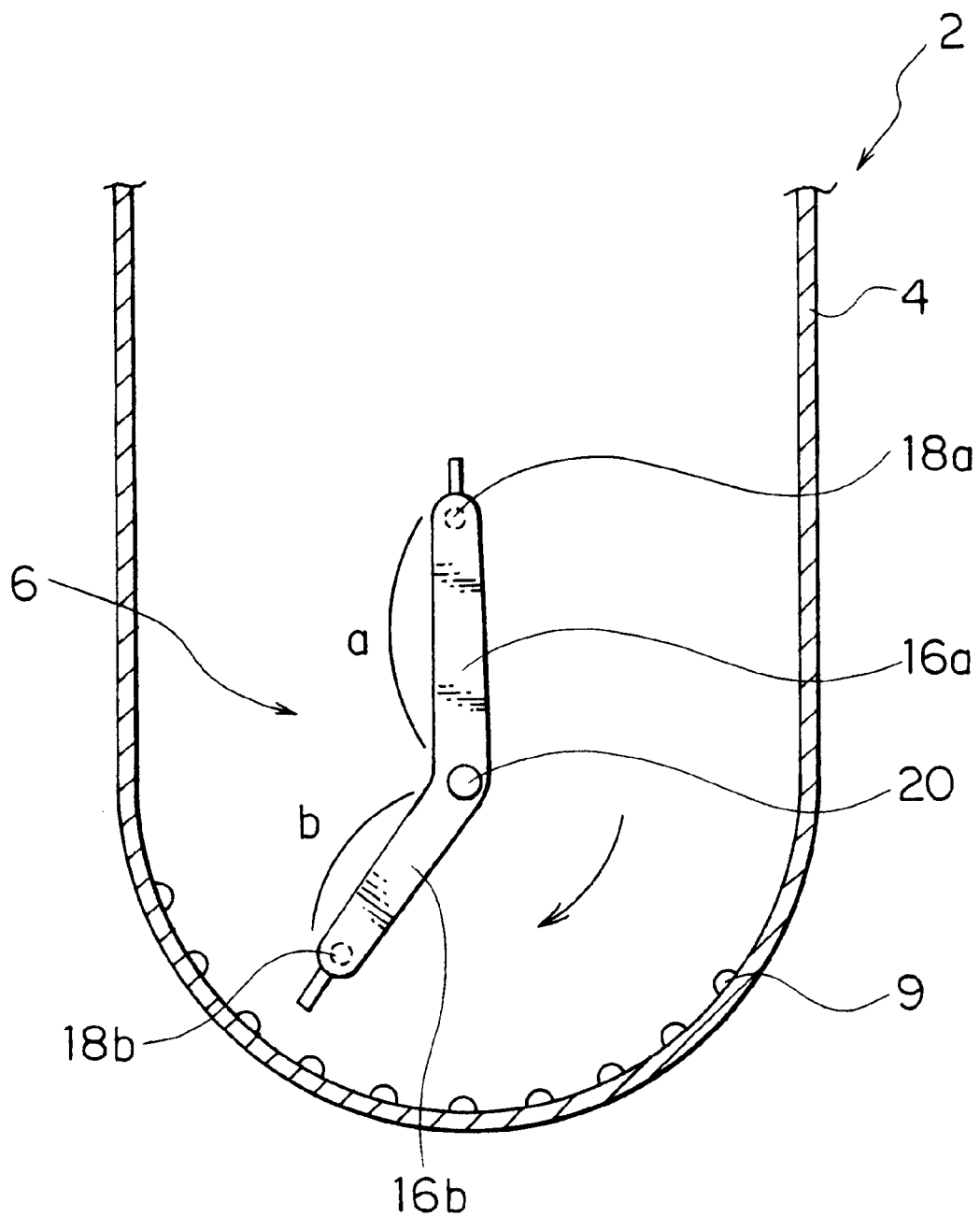
FIG. 1 is a cross-sectional view of a vessel in a typical mixer for noodle used in the invention.

The present invention provides a process for the production of noodles by machines, which comprises the steps of:
(i) preparing a noodle dough with 38 to 55% of water added to a raw material,
(ii) forming the noodle dough into a noodle sheet,
(iii) maturing the noodle sheet at a temperature of 30 to 35° C. and a relative humidity of 70 to 90% for 10 to 60 minutes,
(iv) rolling a matured noodle sheet followed by cutting into strands of noodles, and
(v) stretching the strands at a stretching ratio of 1.5 to 2 times into a desired strand of a noodle product.

The processes of the present invention will be fully described below in the order of the process steps.

Preparation of Noodle Dough

Raw materials for noodles are principally wheat flour, but the nature of wheat flour required for noodle types is largely different. In addition, grain flour conventionally used according to noodle types can be used, e.g. buckwheat flour, rice flour, soybean flour and starch. In general, it is preferred that wheat flour is used alone or in combination with small amounts of other grain flour. In the present invention, the type of raw materials and their formulation are not particularly limited.

In the preparation of the noodle dough, water is added to raw materials, but a solution of salt is used for the dough of "Udon" (standard noodle) and "Kansui" (a solution containing a mixture of sodium carbonate, potassium carbonate and sodium phosphate) or "Kanpun" (the form of "Kansui" being powdered) are used for the dough of "Ra-men" (Chinese type noodle). When salt is used, the quantity of salt is adjusted according to noodle types, market requirements and climate. In general, it is preferred that 3–8 parts by weight of salt based on 100 parts of raw materials are used for the manufacture of "So-men" (very thin noodle), "Hiyamugi" (thin noodle) and "Udon" (standard noodle), and 0–5 parts by weight of salt based on 100 parts of raw material are used for the manufacture of "Soba" (buckwheat noodle). Preferably, 0.1–3 parts by weight of salt and 0.1–2 parts by weight of "Kanpun" based on 100 parts by weight of raw materials are used for the manufacture of "Ra-men" (Chinese type noodles). Preferably, a solution of salt or an aqueous solution of salt and "Kanpun" is used for the preparation of the noodle dough.

As the first requirement in the present invention, the noodle dough with 38–55% of water added to raw materials should be prepared. This percent of water added can be varied within the above range, depending on the types and nature of raw materials, temperature and humidity. The term "percent (%) of water added" as used herein refers to the proportion (% by weight) of water or water in an aqueous solution which is added to raw materials used in the preparation of the noodle dough. Thus, if the aqueous solution added is water which contains salt (salt solution) or "Kansui" which contains "Kanpun", this term means the weight proportion (%) of water based on the weight of raw materials. For example, for the noodle dough prepared by adding 50 parts by weight of a salt solution containing 10% by weight of salt to 100 parts by weight of raw materials, the percent of water added is calculated as $45\% = [(50 \times 0.9)/100] \times 100$.

In the preparation of the noodle dough, edible oils and lipase may be further added, by which the product can be produced with better viscoelasticity and higher quality. In this case, the use of edible oil alone cannot provide an improvement in viscoelasticity. Therefore, a combined use with lipase is required.

Any edible oil can be used if being liquid at an ordinary temperature, but vegetable oils are preferable. The vegetable oils include salad, sesame, rape, cottonseed and soybean oils. They may be used in one or more combinations. Any lipase of food class can be used.

Preferably, 0.1–1.0 g of edible oils and 250–10,000 units of lipase are added to 100 g of raw materials. More preferably, 0.2–0.6 g of edible oils and 1,000–5,000 units of lipase are added. An activity for liberating an acid corresponding to 1 $\mu$mol of oleic acid under a predetermined condition is defined as 1 unit. This unit is determined by emulsifying 100 ml of olive oil and 150 ml of 2% polyvinyl alcohol solution to prepare a substrate, mixing 5 ml of the substrate, 4 ml of McIlvaine's buffer solution (pH 7.0) and 1 ml of $5\times10^{-4}$% enzyme solution to react the mixture at 37° C. for 60 minutes, ceasing the reaction after 60 minutes and titrating the reaction solution with an aqueous solution of 0.05N sodium hydroxide.

In the preparation of the noodle dough, other ingredients than those as described above may be added, if necessary. Examples of other ingredients include colorants, wetting agents, antiseptics, nutrition enhancing agents such as vitamins, minerals and amino acids, yam powders, eggs or egg products, tea powders, seaweed powders and emulsifiers.

The preparation of the noodle dough is carried out by adding to raw materials, water or an aqueous solution containing salt or "Kanpun" so as to provide 38–55% of water added, and optionally adding edible oils and lipase or the above-mentioned other ingredients and kneading the mixture. In general, kneading is preferably conducted in such a manner that the temperature of the noodle dough after mixing is about 20 to 30° C.

The method and apparatus for kneading which have been used in the art can be employed in the preparation of the noodle dough. Typical kneading apparatus used in the present invention can include a mixer for noodles mentioned in the applicant's Japanese Patent Application No. 302027/1996 filed on Nov. 13, 1996.

Figure 2:
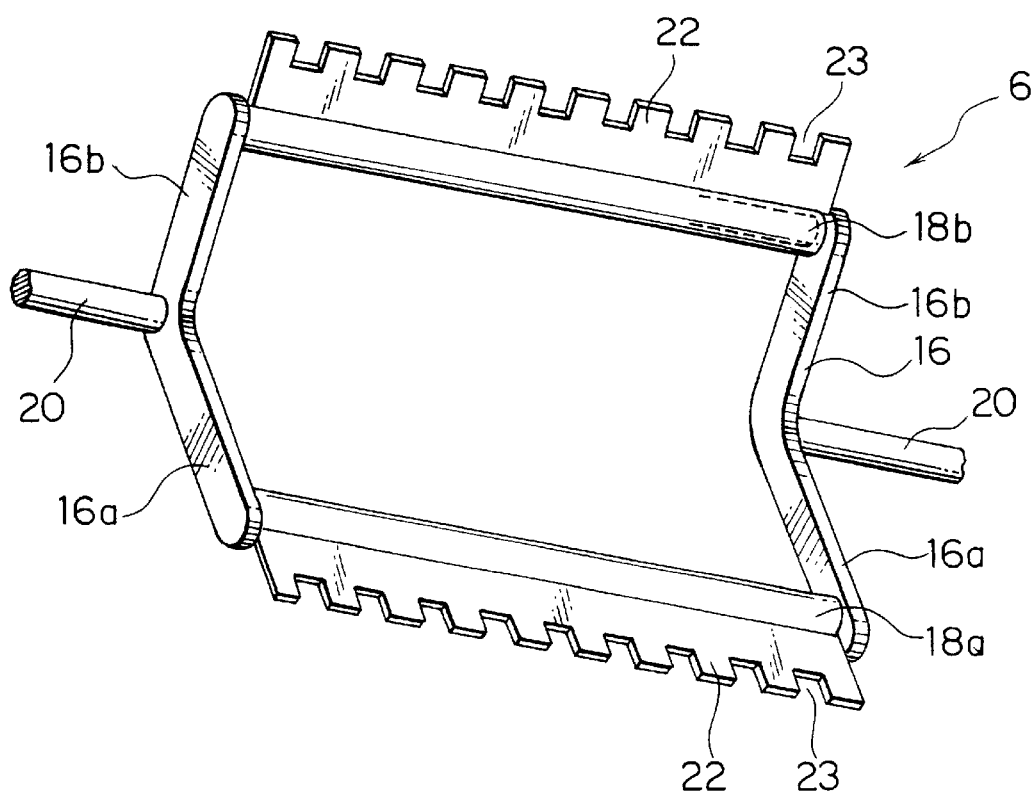
FIG. 2 is a perspective view of an agitator in the mixer shown in FIG. 1.

Referring to the drawings, a mixer 1 for noodles is composed of a vessel 4, an agitator 6 which rotates within the vessel 4 and a motor (not shown) for driving the agitator 6, as shown in FIG. 1. With regard to the construction of the vessel 4, the sides are arranged in parallel, the bottom is curved in a substantially semi-cylindrical form as shown in FIG. 1 and a lid (not shown) is mounted on the top of the vessel. A plurality of hemispherical raised portions 9 consisting of a round-head rivet are provided at the bottom. As shown in FIG. 2, the agitator 6 comprises agitation rods 18a, 18b which are respectively mounted on the arms 16a, 16b, and the arms 16 and the agitation rods 18 constitute together a substantially mouth-like form. A rotation shaft 20 is mounted outwardly on each of the arms 16. The arms 16 comprise a long arm 16a and a short arm 16b, as shown in FIG. 1. A length a extending from the rotation shaft 20 to the agitation rod 18a is longer than a length b extending from the rotation shaft 20 from the agitation rod 18b, and the long arm 16a and the short arm 16b are curved at an angle of about 145°. By such constitution, wheat flour is kneaded effectively and appropriately within the vessel 4 by the agitator 6, by which a suitable noodle dough with high amount of water added can be produced.

Formation of Noodle Sheet

The noodle dough obtained by kneading in the above manner is formed into a noodle sheet by sheeting or sheeting/combining. The formation of the noodle sheet can be carried out by a conventional roll sheeting and other methods, without limiting to the specific method and apparatus for sheeting. The thickness of the noodle sheet can be adjusted depending on kinds of noodles and noodle making operations (in particular, a stretching ratio of a noodle strand) subsequent to the maturation of noodle sheet. For example, the thickness of the noodle sheet on the subsequent maturing is preferably about 3 to 6 mm for "Udon" (standard noodles), and about 2 to 5 mm for "So-men" (very thin noodles), for producing the noodle products having good viscoelasticity.

Maturation of Noodle Sheet

As the second requirement in the present invention, the noodle sheet as formed above should be matured at a temperature of 30 to 35° C. and at a relative humidity of 70 to 90% for 10 to 60 minutes. In general, maturations during the preparation course of noodles include the maturation of noodle dough, the maturation of noodle sheet and the maturation of noodle strands. However, the present invention requires only the maturation of noodle sheet and moreover it is carried out only once. No need of other maturations can bring about a great reduction in process steps as compared with conventional or known methods, which results in the reduction in a cost of the product.

The maturation of noodle sheet should be carried out under the above condition to secure smooth proceeding of the subsequent stretching of noodle strands. So long as the above requirements are not satisfied, the object of the present invention cannot be achieved. Any apparatus can be used regardless of batchwise or continuous type, if the noodle sheet can be matured under the above condition.

Rolling of Matured Noodle Sheet and Cutting into Noodle Strands

The matured noodle sheet is preferably rolled so as to provide not more than 10 of the reduction ratio of the thickness expressed by A/B wherein A represents the thickness of noodle sheet before rolling and B represents the thickness of noodle sheet after rolling. If the reduction ratio (A/B) exceeds 10, there is a tendency that noodle manufacturing processes subsequent to rolling cannot be conducted smoothly or the eating quality of the resulting noodles will be lowered from lack of viscoelasticity. The rolling of the matured noodle sheet can be carried out by conventional rolling processes and apparatus.

Cutting the noodle sheet into strands of noodle is preferably carried out after the width to be cut has been previously decided allowing for the reduction in width of the strands by stretching, so that the dimension (width, thickness) of noodle strands obtained by the subsequent stretching operation becomes the dimension desired in accordance with the kinds of noodles. The thickness of noodle strands is decided by adjusting the gap between a pair of final rolling rolls just prior to cutting. Conventional methods and apparatus can be employed for cutting into noodle strands.

Stretching of Noodle Strands

As the third requirement in the present invention, the noodle strands as cut out should be stretched at a stretching ratio of 1.5 to 2.0 times to form the desired strands of noodles. The term "stretching ratio" as used herein refers to the value (ratio) obtained by dividing the length of strands after stretching by the length of strands before stretching. The term "desired strands of noodles" as used herein means that the dimension of noodle strands obtained by a stretching treatment reaches the dimension desired in each type of noodles with no further stretching treatment, and the noodles obtained by this stretching treatment can be distributed and sold, in the form of uncooked wet noodles, dried or semi-dried noodles after drying, boiled or steamed noodles after boiling or steaming, or instant or frozen noodles after the instant treatment or freezing.

If the stretching ratio is less than 1.5 times in the stretching of the noodle strands as cut out, the stretching is insufficient with poor orientation of gluten network structure and no noodles can be produced having good viscoelasticity and good eating quality. If the stretching ratio is more than 2.0 times, sudden stretching occurs with easy breaking of strands and no noodles can be produced having good viscoelasticity and good eating quality. In case where the noodles are not formed into the desired strands by merely stretching the strands as cut out at a stretching ratio of 1.5 to 2.0 times, the groove width of cutting rolls used for cutting should be changed to the proper width or the gap between a pair of final rolling rolls just before cutting into strands should be adjusted, so that the prescribed stretching is favorably conducted.

Figure 3:
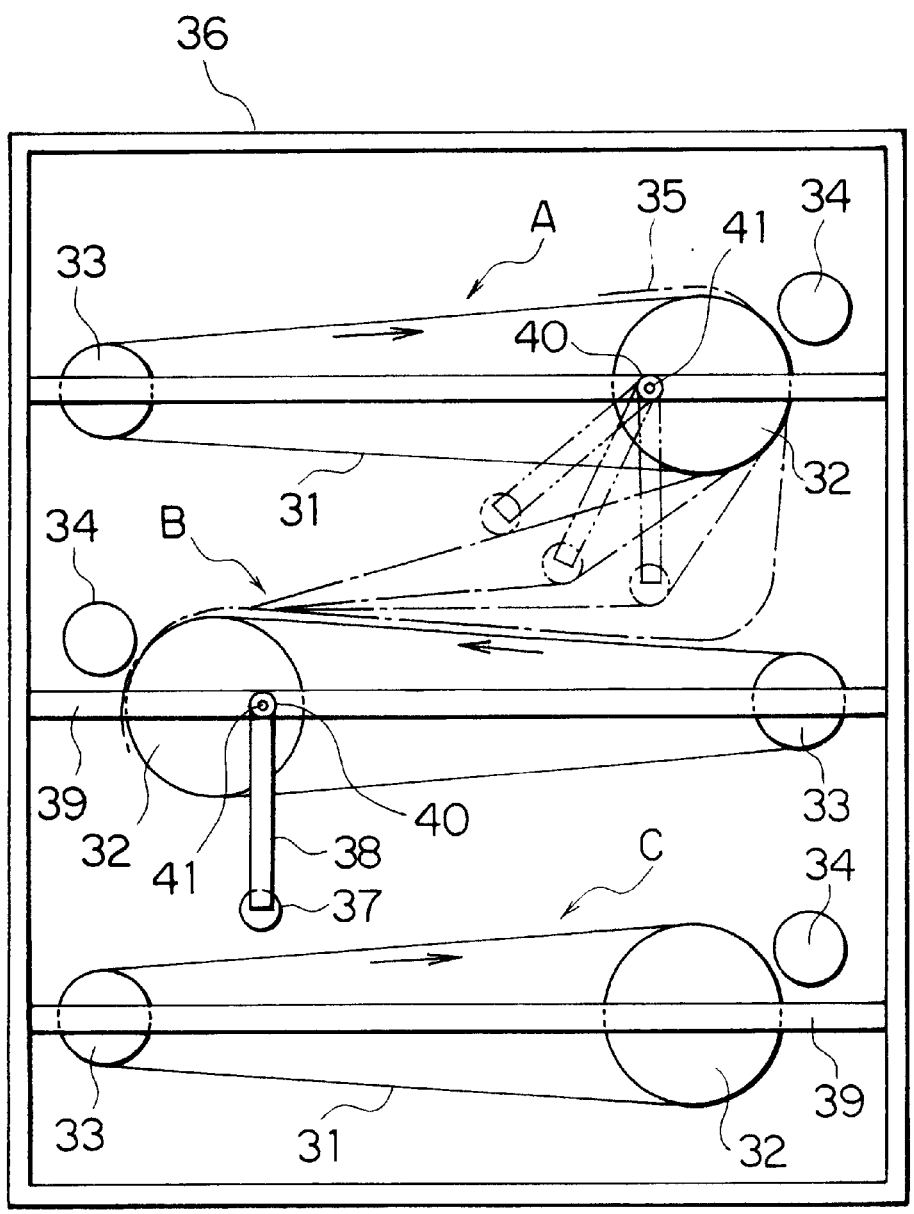
FIG. 3 is a schematic illustration of a typical stretching apparatus used in the invention.

The stretching of noodle strands can be carried out by conventional stretching methods and apparatus. As a typical stretching apparatus can be employed an apparatus for stretching noodle strands disclosed in Japanese Patent Kokai 7-123902, the outline of which is explained hereinbelow, referring to FIG. 3 of the attached drawings. A conveyor A comprises a belt 31 which is engaged on a large roller 32 and a small roller 33. This belt conveyor A is arranged in such a manner that the carrying surface is a little bit slanted upward. A follower roller 34 is arranged at the front end of the carrying direction of the belt conveyor A in an abutment relation with a noodle strand 35. Other belt conveyors B, C having a similar construction to the belt conveyor A are arranged vertically in a multiple stage by means of a casing 36, so that the front end of the carrying direction of the belt conveyor A is placed over the carrying surface of the belt conveyor B and the front end of the carrying direction of the belt conveyor B is placed over the carrying surface of the belt conveyor C. The three belt conveyors are basically constructed so that the rotation speed of the belt conveyor B is faster than that of the belt conveyor A and the rotation speed of the belt conveyor C is faster than that of the belt conveyor B. At the positions where noodle strands 35 are going down to the lower belt conveyors B and C, a tension detection roller 37 is pivoted by a lever 38 to a bearing portion 40 which is mounted on an angle member 39 fixed on the casing 36, so that the tension detection roller 37 changes the position through noodle strands 35. At the bearing portion 40 is arranged a controller 41 for a motor (not shown) for driving the belt conveyors. The controller 41 is devised to change the output signal in accordance with a pivot angle of the lever 38.

The noodles which were formed into desired strands according to the stretching treatment of the present invention can be distributed and sold in the form of uncooked wet noodles, dried or semi-dried noodles which were further subjected to drying treatment, boiled and steamed noodles which were further subjected to gelatinization, and frozen or instant noodles which were further subjected to freezing or instant treatment. In any case, the dimension (thickness, width) of noodle strands just after cutting can be reduced gradually by the stretching treatment according to the present invention and formed into the final products such as "Udon", "Hiyamugi", "So-men" and "Ra-men". The processes of the present invention are particularly suitable for the manufacture of dried noodles. The dried noodles can be manufactured by cutting at a suitable length the desired strands obtained by the stretching treatment of the present invention, and drying the cut strands by a suitable way, e.g. natural drying, controlled drying and freeze-drying.

The processes of the present invention can be applied to the manufacture of other noodles such as "Hiyamugi", "Kishimen", "Ra-men", "Soba" or the like, in addition to "Udon" and "So-men" which will be illustrated by the following examples.

The invention is further illustrated by the following examples.

EXAMPLES 1–6

Manufacture of "Udon" (standard noodles)

25 kg of a soft wheat flour of medium protein content (available from Nisshin Flour Milling Co. Ltd. under registered trade mark, "KIN-SUZURAN") and 12.5 kg of a saline solution (10% salt concentration) were charged into a mixer disclosed in Japanese Patent Appln. No. 302027/1996 and shown in FIGS. 1 and 2 of the attached drawings, which was provided with a 170 liter vessel 4 and an agitator 6 with a rotation rate of 5–100 rpm. The mixture was kneaded at room temperature for 10 minutes to prepare a noodle dough (45% of water added). In Example 5, about 10.56 kg of a saline solution (10% salt concentration) was added to 25 kg of wheat flour to provide 38% of water added. In Example 6, about 15.28 kg of a saline solution (10% salt concentration) was added to 25 kg of wheat flour to provide 55% of water added. The thus prepared noodle dough was removed from the mixer and then subjected to sheeting and combining at room temperature using a roll type sheeting apparatus to prepare noodle sheets with the thickness as shown in the following Table 2.

Subsequently, each of the noodle sheets was matured under the conditions shown in Table 2.

The matured sheet was rolled at room temperature with rolling rolls so as to provide the reduction ratio shown in Table 2 and then the rolled sheet was cut with a #7 or #8 M cutting roll into strands of noodles.

The strands were stretched at room temperature with a strand-stretching apparatus disclosed in Japanese Patent Kokai 7-123902 so as to provide the stretching ratio shown in Table 2 to obtain desired strands of noodles with cross-sectional dimensions of 2.4 mm thickness by 3.0 mm width.

The resultant strands were hung on rods and dried under drying conditions (primary drying temperature 20° C., relative humidity 80%, 0.5 hour; secondary drying temperature 25° C., relative humidity 70%, 1.5 hour; tertiary drying temperature 35° C., relative humidity 70%, 8 hours) to prepare a dried noodle (water content 14%).

Just after the manufacture, 100 g of the dried noodles were boiled in 1 liter of boiling water to a ready-to-eat state, thus giving 290% of a yield of boiled noodles which means that the weight of the boiled noodles was 290 g weighing 2.9 times as much as the original weight (100 g) of the dried noodles. The quality of the boiled noodles was assessed by ten panelists in accordance with the score shown in the following Table 1. The averaged results are shown in Table 2.

TABLE 1

Score for the assessment of boiled noodles

| Score | Assessment |
|---|---|
| 5 | Very high viscoelasticity, very good eating quality or texture |
| 4 | Moderate viscoelasticity, good eating quality |
| 3 | A little viscoelasticity, rather good eating quality |
| 2 | Somewhat lacking in viscoelasticity, rather poor eating quality |
| 1 | Markedly lacking in viscoelasticity, poor eating quality |

COMPARATIVE EXAMPLES 1–8

The dried noodles were prepared by using the same raw materials and apparatus as used in Examples 1–6 and further using the varying requirements for the percent of water added, maturing conditions, reduction ratio after maturing and stretching ratio of noodle strands shown in Table 2, provided that a #9 M cutting roll was used for cutting into strands in Comparative Examples 1–4. The resultant noodles were assessed in the same manner as in Examples 1–6.

COMPARATIVE EXAMPLE 9

Manufacture of "Udon" According to the Process Disclosed in Japanese Patent Kokai 7-123902

25 kg of the same soft wheat flour of medium protein content as used in Example 1 and 12.5 kg of a saline solution (10% salt concentration) were kneaded at room temperature for 10 minutes using the same mixer as used in Example 1 to prepare a noodle dough (45% of water added).

The thus prepared noodle dough was removed from the mixer, and then subjected to sheeting and combining at room temperature using a roll type sheeting apparatus to prepare a noodle sheet with the thickness of 7 mm.

The resultant noodle sheet was matured at 25° C. and 90% R.H. for 30 minutes and cut with a #4 square cutting roll into strands of noodle with cross-sectional dimension of 6.0 mm thickness by 7.5 mm width.

The strands were matured for 30 minutes under the same maturing conditions as mentioned above, and then stretched so as to give strands with cross-sectional dimension of 4.9 mm thickness by 6.1 mm width. The stretched noodles were further matured for 30 minutes under the same maturing conditions as mentioned above, and then stretched so as to give strands with cross-sectional dimension of 3.4 mm thickness by 4.3 mm width using the same stretching apparatus. Furthermore, the stretched noodles were matured for 30 minutes under the same maturing conditions as mentioned above, and then stretched so as to give strands with cross-sectional dimension of 2.4 mm thickness by 3.0 mm width using the same stretching apparatus to prepare the desired strands of noodles. In the above process, the maturation of noodle sheet was carried out once and the maturation of noodle strands was carried out three times, the maturations being made four times in total.

The resultant strands of noodles were hung on rods and dried under the same condition as in Example 1 to prepare dried noodles which were assessed in the same manner as in Example 1.

TABLE 2

| Example No. | | Percent of water added (%) | Thickness of noodle sheet on maturing (mm) | Maturing conditions | | | | Reduction ratio after maturing (A/B) | Stretching ratio of noodle strands (times) | Noodle quality |
|---|---|---|---|---|---|---|---|---|---|---|
| | | | | Temp. (° C.) | Humid. (% RH) | Time (min.) | Frequency | | | |
| Example | 1 | 45 | 5 | 30 | 70 | 30 | 1 | 2.1 | 2.0 | 4.6 |
| | 2 | 45 | 5 | 35 | 80 | 10 | 1 | 2.1 | 1.9 | 4.6 |
| | 3 | 45 | 20 | 30 | 90 | 60 | 1 | 8.3 | 1.6 | 4.5 |
| | 4 | 45 | 3 | 30 | 80 | 30 | 1 | 1.3 | 1.8 | 4.5 |
| | 5 | 38 | 5 | 35 | 85 | 60 | 1 | 2.1 | 1.6 | 4.5 |
| | 6 | 55 | 5 | 30 | 70 | 10 | 1 | 2.1 | 1.9 | 4.5 |
| Comparative Example | 1 | 45 | 25 | 35 | 85 | 60 | 1 | 10.4 | 1.3 | 3.4 |
| | 2 | 45 | 5 | 25 | 90 | 60 | 1 | 2.1 | 1.2 | 3.0 |
| | 3 | 45 | 5 | 35 | 65 | 60 | 1 | 2.1 | 1.3 | 3.2 |
| | 4 | 45 | 2.4 | 35 | 85 | 60 | 1 | Not reduced | 1.3 | 3.1 |
| | 5 | 35 | 5 | 30 | 70 | 30 | 1 | 2.1 | 1.6 | 3.0 |
| | 6 | 58 | 5 | 30 | 70 | 30 | 1 | 2.1 | 1.8 | 3.4 |
| | 7 | 45 | 5 | 30 | 70 | 5 | 1 | 2.1 | 1.4 | 3.1 |
| | 8 | 45 | 5 | 30 | 70 | 70 | 1 | 2.1 | 2.0 | 3.5 |
| | 9 | 45 | 7 | 25 | 90 | 30 | 4 | — | 6.3 | 4.0 |

Table 2 indicates that standard noodles, "Udon" produced by the processes of Examples 1–6 satisfying the requirements of the present invention for the percent of water added, maturing conditions of noodle sheet and the stretching ratio of noodle strands have very high viscoelasticity and very good eating quality, as compared with those obtained in Comparative Examples 1–8 lacking at least one of the above requirements of the present invention. For the cases of Examples 1–6, only one maturing treatment (maturation of noodle sheet) can produce easily "Udon" having high viscoelasticity and good eating quality, in short time period with good productivity, as compared with the case of Comparative Example 9 requiring the maturation of noodle strands three times.

EXAMPLES 7–12

Manufacture of "So-men" (very thin noodles)

25 kg of a soft wheat flour of medium protein content (available from Nisshin Flour Milling Co. Ltd. under registered trade mark, "TOKUSUZUME") and 12.5 kg of a saline solution (10% salt concentration) were charged into the same mixer as used in Examples 1–6. The mixture was kneaded at room temperature for 10 minutes to prepare a noodle dough (45% of water added). In Example 11, about 10.56 kg of a saline solution (10% salt concentration) was added to 25 kg of wheat flour to provide 38% of water added. In Example 12, about 15.28 kg of a saline solution (10% salt concentration) was added to 25 kg of wheat flour to provide 55% of water added.

The thus prepared noodle dough was removed from the mixer and then subjected to sheeting and combining at room temperature using a roll type sheeting apparatus to prepare noodle sheets with the thickness as shown in the following Table 3.

Subsequently, each of the noodle sheets was matured under the conditions shown in Table 3.

The matured sheet was rolled at room temperature with rolling rolls so as to provide the reduction ratio shown in Table 3 and then the rolled sheet was cut with a #22 to #24 round cutting roll into strands of noodles with a circular cross section (1.25–1.36 mm diameter).

The resultant strands were stretched at room temperature with the same strand-stretching apparatus as used in Examples 1–6 so as to provide the stretching ratio shown in Table 3 to obtain desired strands of noodles with the diameter of 1.0 mm.

The resultant strands were hung on rods and dried under drying conditions (primary drying temperature 20° C., relative humidity 80%, 0.5 hour; secondary drying temperature 25° C., relative humidity 70%, 1.5 hour; tertiary drying temperature 35° C., relative humidity 70%, 6 hours) to prepare a dried noodle (water content 14%).

Immediately after the manufacture, 100 g of the dried noodles were boiled in 1 liter of boiling water to a ready-to-eat state, thus giving 280% of a yield of boiled noodles.

The quality of the boiled noodles was assessed by ten panelists in accordance with the score shown in the above Table 1. The averaged results are shown in Table 3.

COMPARATIVE EXAMPLES 10–17

The dried noodles were prepared by using the same raw materials and apparatus as used in Examples 7–12 and further using the varying requirements for the percent of water added, maturing conditions, reduction ratio after maturing and stretching ratio of noodle strands shown in Table 3, provided that the cutting into strands was carried out with #21 to #29 round cutting rolls. The resultant noodles were assessed in the same manner as in Examples 1–6.

COMPARATIVE EXAMPLE 18
Manufacture of "So-men" According to the Process Disclosed in Japanese Patent Kokai 7-123902

25 kg of the same soft wheat flour of medium protein content as used in Examples 7–12 and 12.5 kg of a saline solution (10% salt concentration) were kneaded at room temperature for 10 minutes using the same mixer as used in Examples 1–12 to prepare a noodle dough (45% of water added).

The thus prepared noodle dough was removed from the mixer and then subjected to sheeting and combining at room temperature using a roll type sheeting apparatus to prepare a noodle sheet with the thickness of 3.8 mm.

The resultant noodle sheet was matured at 25° C. and 90% R.H. for 30 minutes and cut with a #15 round cutting roll into strands of noodle with the diameter of 2.0 mm.

The resultant strands were matured for 30 minutes under the same maturing conditions as mentioned above, and then stretched so as to give strands with the diameter of 1.6 mm using the same strand-stretching apparatus as used in Examples 1–6. Subsequently, the stretched noodles were further matured for 30 minutes under the same maturing conditions as mentioned above, and then stretched so as to give strands with the diameter of 1.3 mm using the same stretching apparatus as mentioned above. Furthermore, the stretched noodles were matured for 30 minutes under the same maturing conditions as mentioned above, and then stretched so as to give strands with the diameter of 1.0 mm using the same stretching apparatus as mentioned above to prepare the desired strands of noodles (1.0 mm diameter). In the above process, the maturation of noodle sheet was carried out once and the maturation of noodle strands was carried out three times, the maturations being made four times in total.

The resultant strands of noodles were hung on rods and dried under the same conditions as in Examples 1–12 to prepare dried noodles which were assessed in the same manner as in Examples 7–12.

TABLE 3

| Example No. | | Percent of water added (%) | Thickness of noodle sheet on maturing (mm) | Maturing conditions | | | | Reduction ratio after maturing (A/B) | Stretching ratio of noodle strands (times) | Noodle quality |
|---|---|---|---|---|---|---|---|---|---|---|
| | | | | Temp. (° C.) | Humid. (% RH) | Time (min.) | Frequency | | | |
| Example | 7 | 45 | 4 | 30 | 70 | 30 | 1 | 3.1 | 1.9 | 4.3 |
| | 8 | 45 | 4 | 35 | 80 | 10 | 1 | 3.1 | 1.8 | 4.3 |
| | 9 | 45 | 12 | 30 | 90 | 60 | 1 | 9.2 | 1.6 | 4.2 |
| | 10 | 45 | 2 | 30 | 80 | 30 | 1 | 1.5 | 1.7 | 4.2 |
| | 11 | 38 | 4 | 35 | 85 | 60 | 1 | 3.1 | 1.6 | 4.2 |
| | 12 | 55 | 4 | 30 | 70 | 10 | 1 | 3.1 | 1.9 | 4.2 |
| Comparative Example | 10 | 45 | 15 | 35 | 85 | 60 | 1 | 11.5 | 1.2 | 2.8 |
| | 11 | 45 | 4 | 25 | 90 | 60 | 1 | 3.1 | 1.1 | 2.7 |
| | 12 | 45 | 4 | 35 | 65 | 60 | 1 | 3.1 | 1.3 | 2.9 |
| | 13 | 45 | 1.3 | 35 | 85 | 60 | 1 | Not reduced | 1.2 | 2.8 |
| | 14 | 35 | 4 | 30 | 70 | 30 | 1 | 3.1 | 1.6 | 3.0 |
| | 15 | 58 | 4 | 30 | 70 | 30 | 1 | 3.1 | 1.8 | 3.0 |
| | 16 | 45 | 4 | 30 | 70 | 5 | 1 | 3.1 | 1.4 | 2.9 |
| | 17 | 45 | 4 | 30 | 70 | 70 | 1 | 3.1 | 2.0 | 3.1 |
| | 18 | 45 | 3.8 | 25 | 90 | 30 | 4 | — | 4.0 | 3.7 |

Table 3 indicates that very thin noodles, "So-men" produced by the processes of Examples 1–12 satisfying the requirements of the present invention for the percent of water added, maturing conditions of noodle sheet and stretching ratio of noodle strands have good eating quality, as compared with those obtained in Comparative Examples 10–17 lacking at least one of the above requirements of the present invention. For the cases of Examples 7–12, only one maturing treatment (maturation of noodle sheet) can produce easily "So-men" having good eating quality, in short time period, with good productivity, as compared with the case of Comparative Example 18 requiring the maturation of noodle strands three times.

EXAMPLES 13–18

Very thin dried noodles (dried "So-men") were manufactured in the same manner as in Examples 7–12, but adding 150 g of salad oil (0.6% added to wheat flour) and 50,000 units/kg wheat flour of lipase (available from Nagase Biochemicals Ltd. under the registered trade mark of "LILI-PASE" A-10) to the mixture of 25 kg of the same soft wheat flour of medium protein content and 12.5 kg of a saline solution (10% salt concentration) in the preparation of the noodle dough in Examples 7–12.

Immediately after the manufacture, 100 g of the resultant dried "So-men" were boiled in 1 liter of boiling water to a ready-to-eat state, thus giving 280% of a yield of boiled noodles.

The quality of the boiled noodles was assessed by ten trained panelists in accordance with the score shown in Table 1. The averaged results are shown in Table 4.

COMPARATIVE EXAMPLES 19–26

Very thin dried noodles (dried "So-men") were prepared by using the same raw materials and apparatus as used in Examples 13–18 and further using the varying requirements for the percent of water added, maturing conditions, reduction ratio after maturing and stretching ratio of noodle strands shown in Table 4. The resultant noodles were assessed in the same manner as in Examples 13–18. The averaged results are shown in Table 4.

Table 4 indicates that very thin noodles, "So-men" produced by the processes of Examples 13–18 satisfying the requirements of the present invention for the percent of water added, the maturing condition of noodle sheet and the stretching ratio of noodle strands and further adding an edible oil and lipase to the noodle dough, have very good eating quality as compared with those obtained in Comparative Examples 19–26 lacking at least one of the above requirements of the present invention. As shown in Comparative Examples 19–26, the process lacking at least one of the above requirements of the present invention cannot provide an improvement over the noodles produced by the processes of the present invention, even if an edible oil and lipase were added.

Advantages of the Present Invention

According to the process of the present invention, only one maturation (maturation of noodle sheet) can produce simply the noodles of high quality having good eating quality in a short time period with good productivity. Further, the addition of an edible oil and lipase in the preparation of noodle dough can produce the noodles having higher viscoelasticity and better eating quality.

What is claimed is:

1. A process for the production of noodles by machines, which comprises the steps of:
    (i) preparing a noodle dough with 38 to 55% of water added to a raw material,
    (ii) forming the noodle dough into a noodle sheet,
    (iii) maturing only once the noodle sheet at a temperature of 30 to 35° C. and a relative humidity of 70 to 90% for 10 to 60 minutes,
    (iv) rolling a matured noodle sheet followed by cutting into strands of noodles, and
    (v) stretching the strands at a stretching ratio of 1.5 to 2 times into desired strands of a noodle product.

2. The process of claim 1 wherein an edible oil and lipase are further added to the noodle dough.

3. The process of claim 1 or 2 wherein the matured noodle sheet was rolled at a reduction ratio of not more than 10.

4. The process of claim 1 or 2 wherein the preparation of the noodle dough is carried out using a mixer having a vessel and an agitator.

TABLE 4

| Example No. | | Percent of water added (%) | Addition of edible oil | Addition of lipase | Thickness of noodle sheet on maturing (mm) | Maturing conditions | | | | Reduction ratio after maturing (A/B) | Stretching ratio of noodle strands (times) | Noodle quality |
|---|---|---|---|---|---|---|---|---|---|---|---|---|
| | | | | | | Temp. (° C.) | Humid. (% RH) | Time (min.) | Frequency | | | |
| Example | 13 | 45 | Yes | Yes | 4 | 30 | 70 | 30 | 1 | 3.1 | 1.9 | 4.6 |
| | 14 | 45 | Yes | Yes | 4 | 35 | 80 | 10 | 1 | 3.1 | 1.8 | 4.6 |
| | 15 | 45 | Yes | Yes | 12 | 30 | 90 | 60 | 1 | 9.2 | 1.6 | 4.5 |
| | 16 | 45 | Yes | Yes | 2 | 30 | 80 | 30 | 1 | 1.5 | 1.7 | 4.5 |
| | 17 | 38 | Yes | Yes | 4 | 35 | 85 | 60 | 1 | 3.1 | 1.6 | 4.5 |
| | 18 | 55 | Yes | Yes | 4 | 30 | 70 | 10 | 1 | 3.1 | 1.9 | 4.5 |
| Comparative Example | 19 | 49 | Yes | Yes | 15 | 35 | 85 | 60 | 1 | 11.5 | 1.2 | 3.2 |
| | 20 | 45 | Yes | Yes | 4 | 25 | 90 | 60 | 1 | 3.1 | 1.1 | 3.0 |
| | 21 | 45 | Yes | Yes | 4 | 35 | 65 | 60 | 1 | 3.1 | 1.3 | 3.4 |
| | 22 | 45 | Yes | Yes | 1.3 | 35 | 85 | 60 | 1 | Not reduced | 1.2 | 3.1 |
| | 23 | 35 | Yes | Yes | 4 | 30 | 70 | 30 | 1 | 3.1 | 1.6 | 3.3 |
| | 24 | 58 | Yes | Yes | 4 | 30 | 70 | 30 | 1 | 3.1 | 1.8 | 3.2 |
| | 25 | 45 | Yes | Yes | 4 | 30 | 70 | 5 | 1 | 3.1 | 1.4 | 3.1 |
| | 26 | 45 | Yes | Yes | 4 | 30 | 70 | 70 | 1 | 3.1 | 2.0 | 3.2 |

5. The process of claim 1 or 2 wherein the stretching of noodle strands is carried out using a strand-stretching apparatus.

6. The process of claim 1 or 2 wherein the raw material is at least one material selected from the group consisting of wheat flour, buckwheat flour, rice flour, soybean flour, and starch.

7. The process of claim 1 or 2 wherein the raw material contains salt or "Kansui" solution.

8. The process of claim 1 or 2 further comprising the step of drying the desired strands of the noodle product.

* * * * *